United States Patent
Kapinos et al.

(10) Patent No.: US 11,086,867 B2
(45) Date of Patent: Aug. 10, 2021

(54) EXCLUDING SEARCH RESULTS BASED ON RELEVANCE

(71) Applicant: LENOVO (Singapore) PTE. LTD., New Tech Park (SG)

(72) Inventors: Robert James Kapinos, Durham, NC (US); Timothy Winthrop Kingsbury, Cary, NC (US); Scott Wentao Li, Cary, NC (US); Russell Speight VanBlon, Raleigh, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 282 days.

(21) Appl. No.: 15/942,098

(22) Filed: Mar. 30, 2018

(65) Prior Publication Data
US 2019/0303477 A1  Oct. 3, 2019

(51) Int. Cl.
 *G06F 16/2453* (2019.01)
 *G06F 16/9535* (2019.01)

(52) U.S. Cl.
 CPC .... *G06F 16/24539* (2019.01); *G06F 16/9535* (2019.01)

(58) Field of Classification Search
 None
 See application file for complete search history.

(56) References Cited

U.S. PATENT DOCUMENTS

| | | | |
|---|---|---|---|
| 2006/0106847 A1* | 5/2006 | Eckardt, III | G06F 16/338 |
| 2008/0147636 A1* | 6/2008 | Sarukkai | G06F 16/78 |
| 2016/0246476 A1* | 8/2016 | Harris | H04W 4/21 |
| 2018/0129368 A1* | 5/2018 | Cheung | G06F 16/248 |

* cited by examiner

*Primary Examiner* — Tuankhanh D Phan
(74) *Attorney, Agent, or Firm* — Kunzler Bean & Adamson

(57) ABSTRACT

Apparatuses, methods, systems, and program products are disclosed for excluding search results based on relevance. A method includes identifying, by a processor, one or more search results that are not relevant to a search query. The one or more search results may be received in response to performing the search query using one or more search keywords. The method includes determining one or more exclusion characteristics of the one or more search results that are identified as not being relevant to the search query. The method includes updating the one or more search results based on the one or more exclusion characteristics of the non-relevant search results such that search results that comprise the one or more exclusion characteristics are excluded from the search results.

20 Claims, 5 Drawing Sheets

EXCLUDING SEARCH RESULTS BASED ON RELEVANCE

FIELD

The subject matter disclosed herein relates to searching and more particularly relates to excluding search results based on relevance.

BACKGROUND

When a user performs a search query, such as an Internet search, the search results may rank or sort the search results according to a predetermined relevance ranking algorithm. However, some of the search results may not in fact be relevant to the search terms of the search query. In other words, some of the search results may not be relevant to what the user intended to search for.

BRIEF SUMMARY

An apparatus for excluding search results based on relevance is disclosed. The apparatus, in one embodiment, includes a processor and a memory that stores code executable by the processor. In one embodiment, the memory stores code executable by the processor to identify one or more search results that are not relevant to a search query. The one or more search results may be received in response to performing the search query using one or more search keywords. In a further embodiment, the memory stores code executable by the processor to determine one or more exclusion characteristics of the one or more search results that are identified as not being relevant to the search query. In certain embodiments, the memory stores code executable by the processor to update the one or more search results based on the one or more exclusion characteristics of the non-relevant search results such that search results that comprise the one or more exclusion characteristics are excluded from the search results.

A method for excluding search results based on relevance includes identifying, by a processor, one or more search results that are not relevant to a search query. The one or more search results may be received in response to performing the search query using one or more search keywords. The method includes determining one or more exclusion characteristics of the one or more search results that are identified as not being relevant to the search query. The method includes updating the one or more search results based on the one or more exclusion characteristics of the non-relevant search results such that search results that comprise the one or more exclusion characteristics are excluded from the search results.

A program product for excluding search results based on relevance, in one embodiment, includes a computer readable storage medium that stores code executable by a processor. In some embodiments, the executable code includes code to perform identifying one or more search results that are not relevant to a search query. The one or more search results may be received in response to performing the search query using one or more search keywords. The executable code, in certain embodiments, includes code to perform determining one or more exclusion characteristics of the one or more search results that are identified as not being relevant to the search query. The executable code, in certain embodiments, includes code to perform updating the one or more search results based on the one or more exclusion characteristics of the non-relevant search results such that search results that comprise the one or more exclusion characteristics are excluded from the search results.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
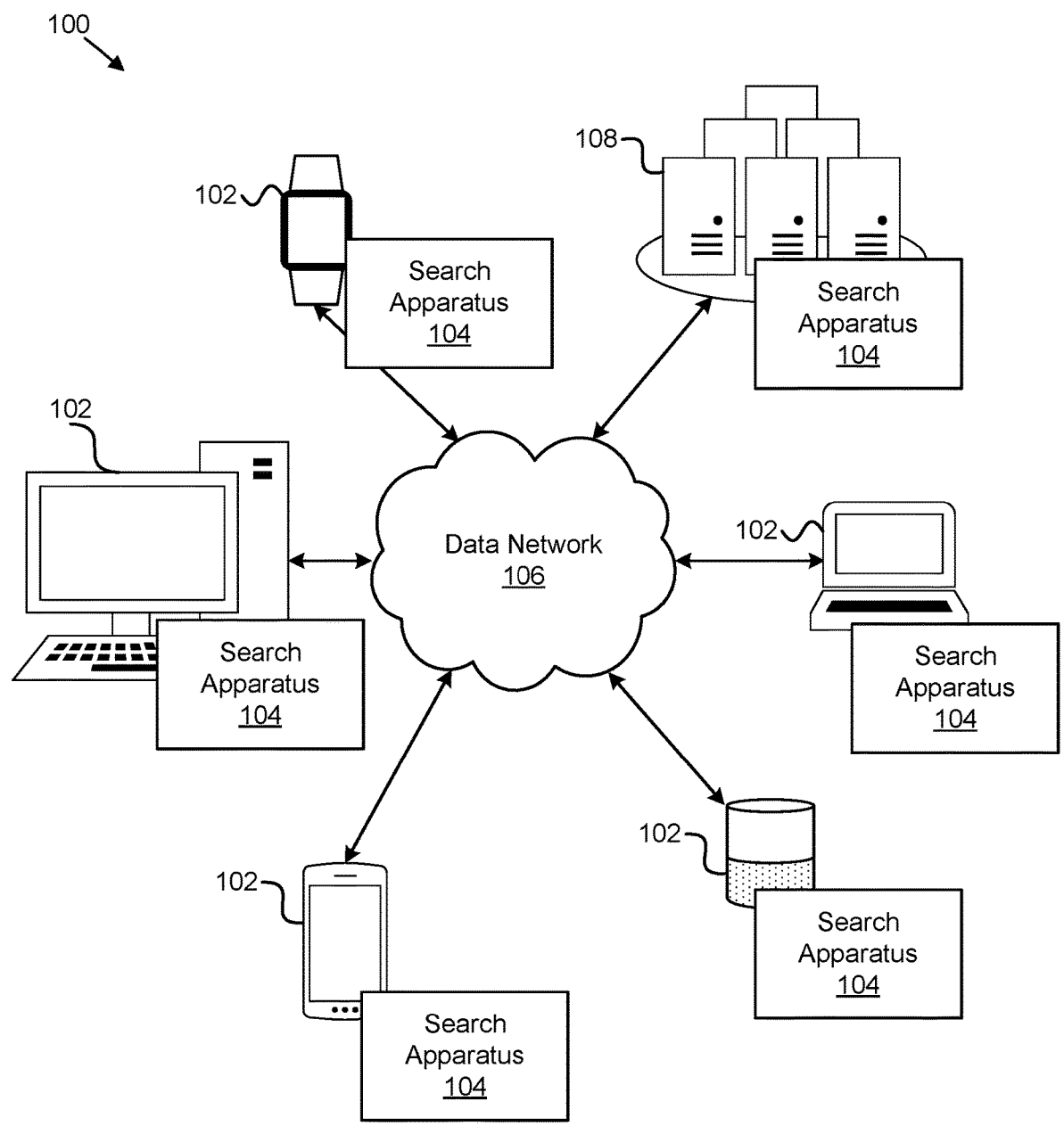
FIG. 1 is a schematic block diagram illustrating one embodiment of a system for excluding search results based on relevance.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for excluding search results based on relevance is disclosed. The apparatus, in one embodiment, includes a processor and a memory that stores code executable by the processor. In one embodiment, the memory stores code executable by the processor to identify one or more search results that are not relevant to a search query. The one or more search results may be received in response to performing the search query using one or more search keywords. In a further embodiment, the memory stores code executable by the processor to determine one or more exclusion characteristics of the one or more search results that are identified as not being relevant to the search query. In certain embodiments, the memory stores code executable by the processor to update the one or more search results based on the one or more exclusion characteristics of the non-relevant search results such that search results that comprise the one or more exclusion characteristics are excluded from the search results.

In one embodiment, updating the one or more search results comprises performing a second search query using the one or more search keywords and presenting search results of the second search query that exclude search results comprising the one or more exclusion characteristics. In certain embodiments, updating the one or more search results comprises removing search results that comprise the one or more exclusion characteristics from the one or more search results.

In one embodiment, identifying the one or more search results that are not relevant to the search query comprises receiving input from a user. The user input may include input indicating one or more search results that are not relevant to the search query. In further embodiments, the user input indicating one or more search results that are not relevant to the search query comprises a selection of one or more exclusion characteristics of a search result.

In some embodiments, the one or more exclusion characteristics of a search result comprises a date, a topic, a relevance factor, a trending factor, a search term definition, and a popularity. In one embodiment, the apparatus includes code that is further executable by the processor to provide one or more recommendations for excluding search results from the one or more search results.

In one embodiment, the executable code is configured as a plugin to web browser. The plugin may be executed in response to a search query being performed within a search field of a web page presented within the web browser. In certain embodiments, the executable code is executed on a server performing the search query in response to receiving the one or more keywords and a command to execute the search query.

In one embodiment, the apparatus includes code that is further executable by the processor to generate a user profile comprising a user's selections for excluding one or more search results. The user's selections may include previously selected search results to exclude and previously selected exclusion characteristics of excluded search results. In various embodiments, the apparatus includes code that is further executable by the processor to notify a user of the search results that are excluded from the one or more search results based on the one or more exclusion characteristics.

A method for excluding search results based on relevance includes identifying, by a processor, one or more search results that are not relevant to a search query. The one or more search results may be received in response to performing the search query using one or more search keywords. The method includes determining one or more exclusion characteristics of the one or more search results that are identified as not being relevant to the search query. The method includes updating the one or more search results based on the one or more exclusion characteristics of the non-relevant search results such that search results that comprise the one or more exclusion characteristics are excluded from the search results.

In one embodiment, updating the one or more search results comprises performing a second search query using the one or more search keywords and presenting search results of the second search query that exclude search results comprising the one or more exclusion characteristics. In certain embodiments, updating the one or more search results comprises removing search results that comprise the one or more exclusion characteristics from the one or more search results.

In further embodiments, identifying the one or more search results that are not relevant to the search query comprises receiving input from a user. The user input may include input indicating one or more search results that are not relevant to the search query. In certain embodiments, the user input indicating one or more search results that are not relevant to the search query comprises a selection of one or more exclusion characteristics of a search result.

In one embodiment, the one or more exclusion characteristics of a search result comprises a date, a topic, a relevance factor, a trending factor, a search term definition, and a popularity. In some embodiments, the method includes generating a user profile comprising a user's selections for excluding one or more search results. The user's selections may include previously selected search results to exclude and previously selected exclusion characteristics of excluded search results. In various embodiments, the method includes notifying a user of the search results that are excluded from the one or more search results based on the one or more exclusion characteristics.

A program product for excluding search results based on relevance, in one embodiment, includes a computer readable storage medium that stores code executable by a processor. In some embodiments, the executable code includes code to perform identifying one or more search results that are not relevant to a search query. The one or more search results may be received in response to performing the search query using one or more search keywords. The executable code, in certain embodiments, includes code to perform determining one or more exclusion characteristics of the one or more search results that are identified as not being relevant to the search query. The executable code, in certain embodiments, includes code to perform updating the one or more search results based on the one or more exclusion characteristics of the non-relevant search results such that search results that comprise the one or more exclusion characteristics are excluded from the search results.

FIG. 1 is a schematic block diagram illustrating one embodiment of a system 100 for excluding search results based on relevance. In one embodiment, the system 100 includes one or more information handling devices 102, one or more search apparatuses 104, one or more data networks 106, and one or more servers 108. In certain embodiments, even though a specific number of information handling devices 102, search apparatuses 104, data networks 106, and servers 108 are depicted in FIG. 1, one of skill in the art will recognize, in light of this disclosure, that any number of information handling devices 102, search apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for performing searches using the information handling devices 102.

In one embodiment, the search apparatus 104 provides a solution over conventional, routine and well-understood search methods by allowing the user to exclude search results that are not relevant to the user's intended search. In other words, the user can exclude search results that are not relevant to, related to, associated with, or otherwise do not correspond to the search terms used for the search query that generates the search results. Conventional search methods, on the other hand, may provide a flat list of search results that are sorted, organized, arranged, and/or the like according to predetermined search characteristics such as a relevance ranking, whether the search results are popular or trending, and/or the like, without providing means for the user to specify which results are actually relevant or not.

In one embodiment, the search apparatus 104 identifies one or more search results that are not relevant to a search query, determines one or more exclusion characteristics of the one or more search results, and updates the one or more search results based on the one or more exclusion characteristics of the non-relevant search results such that search results that comprise the one or more characteristics are excluded from the search results. The search apparatus 104, including its various sub-modules, may be located on one or more information handling devices 102 in the system 100, one or more servers 108, one or more network devices, and/or the like. The search apparatus 104 is described in more detail below with reference to FIGS. 2 and 3.

In various embodiments, the search apparatus 104 may be embodied as a hardware appliance that can be installed or deployed on an information handling device 102, on a server 108, or elsewhere on the data network 106. In certain embodiments, the search apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the search apparatus 104 may include a power interface, a wired and/or wireless network interface, a graphical interface that attaches to a display, and/or a semiconductor integrated circuit device as described below, configured to perform the functions described herein with regard to the search apparatus 104.

The search apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the search apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the search apparatus 104.

The semiconductor integrated circuit device or other hardware appliance of the search apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the search apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, e.g., usage pattern data describing the user's use of an information handling device 102.

Figure 2:
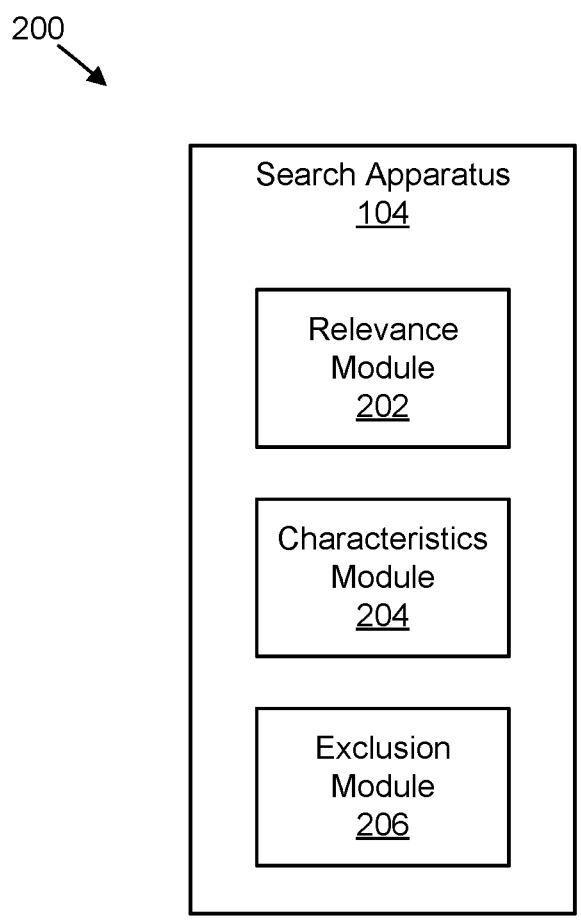
FIG. 2 is a schematic block diagram illustrating one embodiment of an apparatus for excluding search results based on relevance.

FIG. 2 is a schematic block diagram illustrating one embodiment of an apparatus 200 for excluding search results based on relevance. In one embodiment, the apparatus 200 includes an embodiment of a search apparatus 104. The search apparatus 104, in some embodiments, includes one or more of a relevance module 202, a characteristics module 204, and an exclusion module 206, which are described in more detail below.

The relevance module 202, in one embodiment, is configured to identify one or more search results that are not relevant to a search query. In certain embodiments, the search results are received in response to performing a search query using one or more search keywords or terms. An example search query may be a Google® search that includes entering one or more search keywords or terms into a search box and receiving a plurality of search results for websites that the Google® search engine thinks are relevant to the user's search terms.

In one embodiment, the relevance module 202 identifies one or more search results that are not relevant to a search query by receiving input from a user that indicates which of the plurality of search results are not relevant to the search query. For example, if a user is looking for information on the Internet regarding a plane safely landing on a highway in 1980 in Virginia, the user may enter the search terms "airplane highway land Virginia." The search engine, however, may return search results that are for a similar, but more recent, event where a plane safely landed on a highway in Virginia in 2017. The relevance module 202 may identify which of the search results are not relevant to the user's search query in response to the user selecting one or more of the search results that are not related to the search query, e.g., the search results for the more recent plane landing event in 2017.

In certain embodiments, the relevance module 202 may be executed as part of a plugin to a web browser, or other searching tool, and may provide, insert, modify, generate, and/or the like interface components that allow the user to select or identify search results that are not relevant to the search query in response to the search query. For example, when a user runs a Google® search for one or more search terms, the relevance module 202 may provide an interface element, e.g., a radio button, a checkbox, and/or the like adjacent to the search results so that the user can mark or tag search results that are not relevant to the user's search query.

The characteristics module 204, in one embodiment, is configured to determine one or more exclusion characteristics of the one or more search results that are identified as not being relevant to the search query. Exclusion characteristics, as used herein, may include data, metadata, information, and/or the like for a search result that a search engine may consider when determining the relevance of a search result to a search query.

For example, exclusion characteristics may include a date or dates of when the webpage linked to a search result was posted, modified, created, and/or the like, and/or dates included in the content of the webpage (e.g., a search engine may place more recent search results first or near the top of a list); a topic or subject of the content of the webpage linked to a search result; a factor indicating how much the webpage linked to a search result is trending (e.g., how many "likes," "tweets," "retweets," or the like the webpage and/or link to the webpage is getting on social media); definitions of words within the content of the webpage linked to a search result and how the definitions correspond to the search terms (e.g., the word "level" has many meanings such as a height, achievement, a measuring tool, an expertise, etc., and thus the relevance of the search result to the search word "level" may turn on whether the search result is linked to a webpage that uses the search word with the same meanings or definitions); and/or a popularity factor that indicates how popular a webpage is that a search result links to (e.g., as determined by page views, lick clicks, social media data, and/or the like).

Thus, in one embodiment, the search module 202 provides ways for the user to exclude and/or tailor search results to what the user is really searching for with their search query, instead of having to sort through numerous non-relevant search results to find a search result that is relevant to what the user intended to search for with the search terms that were entered.

In certain embodiments, the characteristics module 204 may be executed as part of a plugin to a web browser, or other searching tool, and may provide, insert, modify, generate, and/or the like interface components that allow the user to select or identify search results that are not relevant to the search query. For example, when a user runs a Google® search for one or more search terms, the characteristics module 204 may provide interface elements that display the various characteristics of the search result that were used to determine the relevance of the search result to the search terms. For instance, the characteristics module 204 may receive metadata for each search result from a search engine that includes information describing the characteristics that the search engine considered when making its relevance determination.

In such an embodiment, the characteristics module 204 may display the different characteristics of the search result that were taken into account to determine the search result's relevance. For example, the characteristics module 204 may display the date(s) that were considered, trending factors, social factors, popularity factors, term meanings/definitions, and/or the like. The characteristics module 204 may make the presented characteristics selectable so the user can selectively mark which of the characteristics the user would like to exclude from all, each, or other search results that are related to the particular search query.

The exclusion module 206, in one embodiment, is configured to update the one or more search results based on the one or more exclusion characteristics of the non-relevant search results such that search results that comprise the one or more exclusion characteristics are excluded from the search results.

For instance, in one embodiment, the exclusion module 206 updates the one or more search results by performing a second search query using the one or more keywords that the user entered for the original search query. In such an embodiment, the exclusion module 206 hides, excludes, or otherwise does not display search results that comprise the one or more exclusion characteristics that the characteristics module 204 determines are not relevant to the search query, and allows search results that do not include the exclusion characteristics to be presented.

In further embodiments, the exclusion module 206 updates the one or more search results by removing search results that comprise the one or more exclusion characteristics from the search results. In such an embodiment, instead of performing a new search, the exclusion module 206 hides, removes, excludes, and/or the like search results from the current set of search results that comprise the exclusion characteristics so that the search results contain search results that are relevant to the search query.

In one embodiment, the exclusion module 206 may be executed as a plugin to a web browser in order to generate a new search using the exclusion characteristics or update the existing search results list to exclude search results that comprise the exclusion characteristics. In further embodiments, the exclusion module 206 is configured as a core part of a search engine, as a plugin or add-in to the search engine, and/or the like. In such an embodiment, the search engine may perform the search on a backend server 108 and return only search results that do not comprise the determined exclusion characteristics.

Figure 3:
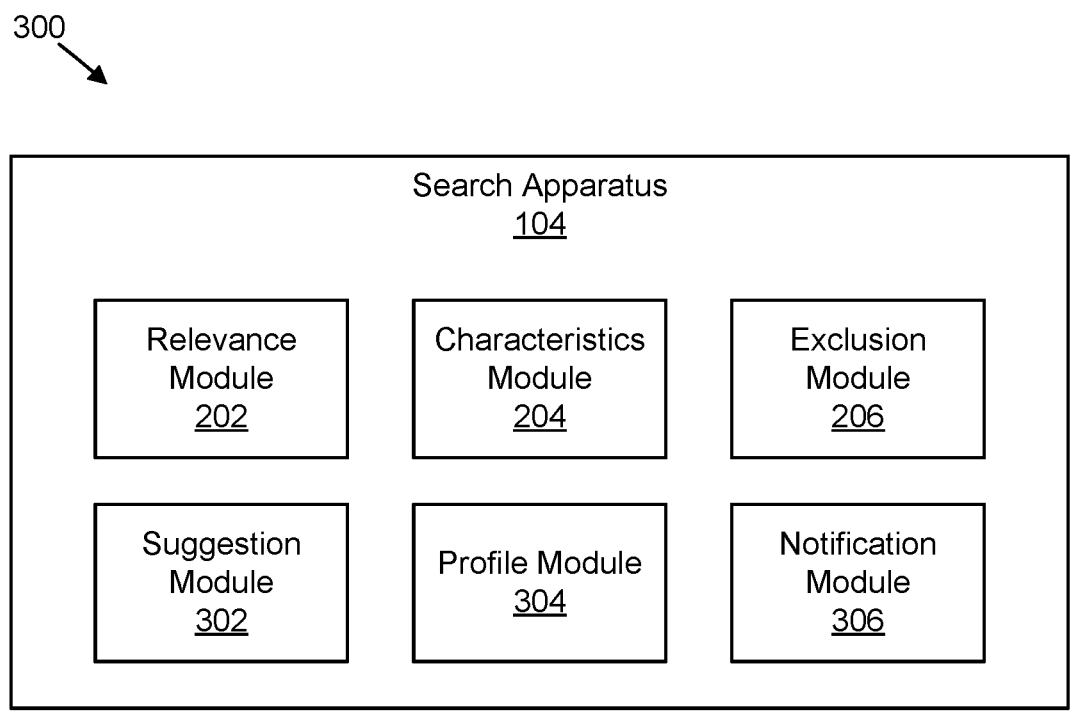
FIG. 3 is a schematic block diagram illustrating one embodiment of another apparatus for excluding search results based on relevance.

FIG. 3 is a schematic block diagram illustrating one embodiment of an apparatus 300 for excluding search results based on relevance. In one embodiment, the apparatus 300 includes an embodiment of a search apparatus 104. The search apparatus 104, in some embodiments, includes one or more of a relevance module 202, a characteristics module 204, and an exclusion module 206, which may be substantially similar to the relevance module 202, the characteristics module 204, and the exclusion module 206 described above with reference to FIG. 2. In further embodiments, the search apparatus 104 includes one or more of a suggestion module 302, a profile module 304, and/or a notification module 306, which are described in more detail below.

The suggestion module 302, in one embodiment, is configured to provide one or more recommendations for excluding search results from the one or more search results in the search results list. For instance, in response to the user selecting a search result to exclude, the suggestion module 302 may highlight, tag, mark, or otherwise indicate other search results that have similar exclusion characteristics as the selected search result and that the user may want to exclude from the search results list (e.g., by highlighting the other search results, by drawing a box around the other search results, by underlining the other search results, and/or the like).

Similarly, if the user selects exclusion characteristics that the user wants to exclude from the search results, e.g., certain dates, terms, trend factors, etc., the suggestion module 302 may suggest other characteristics in response to the user input that the user may want to exclude. For instance, if the user selects to exclude search results for webpages that exceed a number of webpage visits within the last 48 hours, the suggestion module 302 may also suggest excluding results that receive a certain number of "likes," "tweets," and/or other social network trend identifiers.

The profile module 304, in one embodiment, is configured to generate, update, modify, and/or the like a user profile comprising a user's selections for excluding one or more search results. In one embodiment, the user's selections include previously selected search results to exclude and previously selected exclusion characteristics of excluded search results. In such an embodiment, the user profile may be a profile for the search engine that is being used, e.g., a Google® profile, a Yahoo!® profile, and/or the like.

In such an embodiment, the profile may comprise the user's search history, any excluded search results associated with a search query, exclusion characteristics for a search query that the user selected, and/or the like. In this manner, the user can maintain a history of excluded search results that the search engine can use to determine whether future search results should be excluded. For instance, the search engine may check the user's profile to see if a user has previously run a search query with search terms as the instant search query. If so, the search engine may determine search results and/or exclusion characteristics that the user selected to exclude, and exclude those results from the instant search results.

The notification module 306, in one embodiment, is configured to notify a user of the search results that are excluded from the one or more search results based on the one or more exclusion characteristics. For example, the notification module 306 may present a link, button, or the like to show the search results that were excluded from the search results list. The notification module 306, in certain embodiments, presents a message to the user that some search results were excluded from the search results list based on certain characteristics of the search results and the determined relevance of the search results to the keywords. Accordingly, the notification module 306 may provide additional information for the user to view such as which characteristics triggered excluding the results, the characteristics of each of the search results that were excluded, and/or the like.

Figure 4:
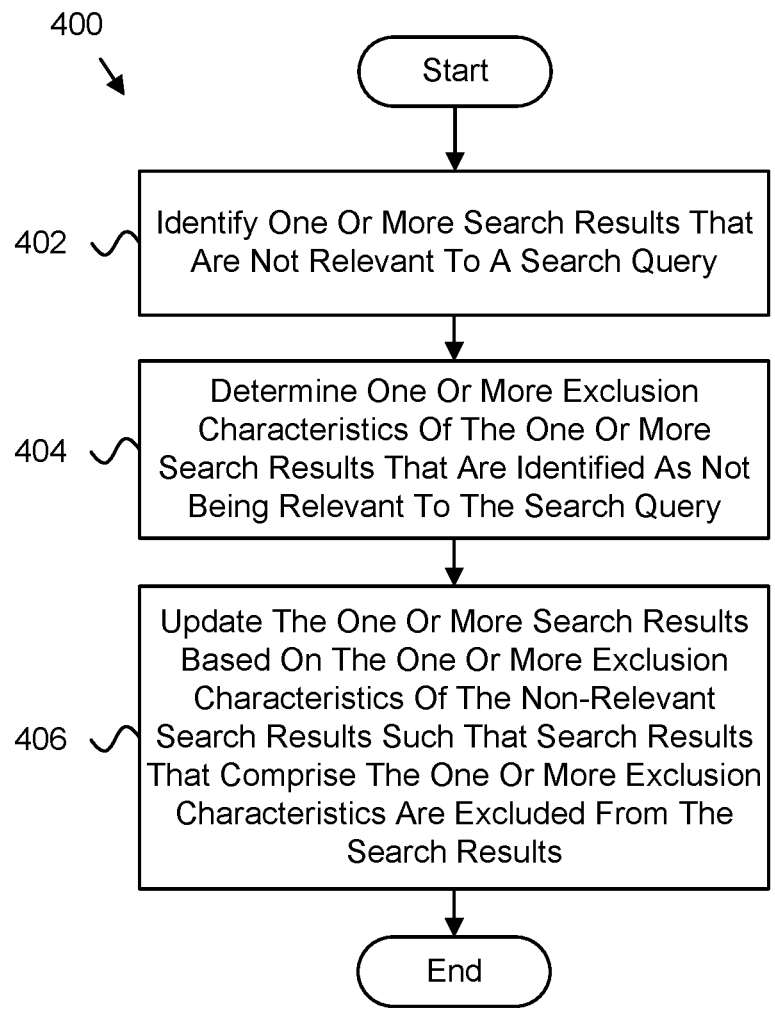
FIG. 4 is a schematic flow chart diagram illustrating one embodiment of a method for excluding search results based on relevance.

FIG. 4 is a schematic flow chart diagram illustrating one embodiment of a method 400 for excluding search results based on relevance. In one embodiment, the method 400 begins and the relevance module 202 identifies 402 one or more search results that are not relevant to a search query. In certain embodiments, the characteristics module 204 determines 404 one or more exclusion characteristics of the one or more search results that are identified as not being relevant to the search query. In further embodiments, the exclusion module 206 updates 406 the one or more search results based on the one or more exclusion characteristics of the non-relevant search results such that search results that comprise the one or more exclusion characteristics are excluded from the search results, and the method 400 ends.

Figure 5:
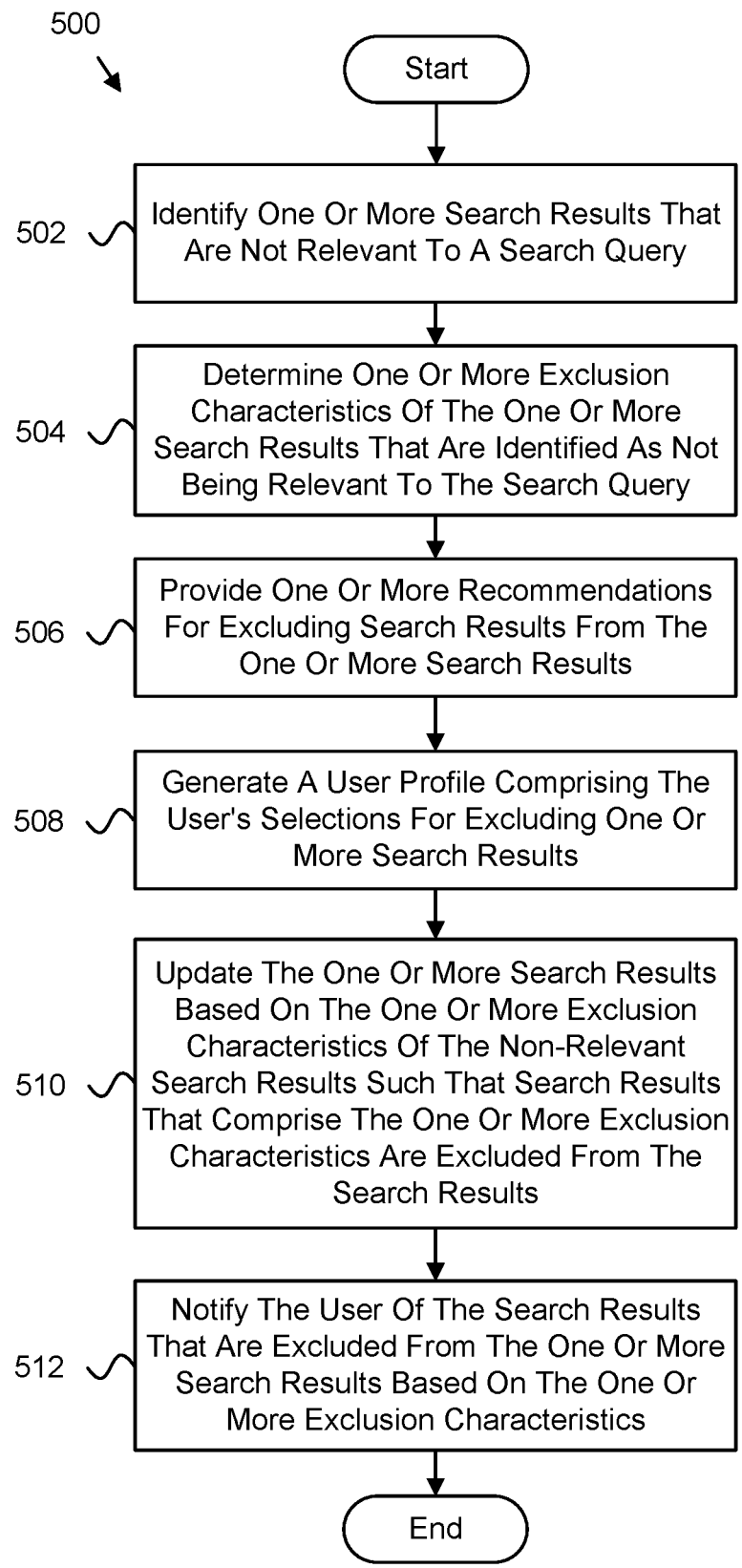
FIG. 5 is a schematic flow chart diagram illustrating one embodiment of another method for excluding search results based on relevance.

FIG. 5 is a schematic flow chart diagram illustrating one embodiment of another method 500 for excluding search results based on relevance. In one embodiment, the method 500 begins and the relevance module 202 identifies 502 one or more search results that are not relevant to a search query. In certain embodiments, the characteristics module 204 determines 504 one or more exclusion characteristics of the one or more search results that are identified as not being relevant to the search query.

In various embodiments, the suggestion module 302 provides 506 one or more recommendations for excluding search results from the one or more search results. In one embodiment, the profile module 304 generates 508 a user profile comprising the user's selections for excluding one or more search results. The user's selections may include previously selected search results to exclude and previously selected exclusion characteristics of excluded search results.

In further embodiments, the exclusion module 206 updates 510 the one or more search results based on the one or more exclusion characteristics of the non-relevant search results such that search results that comprise the one or more exclusion characteristics are excluded from the search results. In some embodiments, the notification module 306 notifies 512 the user of the search results that are excluded from the one or more search results based on the one or more exclusion characteristics, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores code executable by the processor to:
      identify one or more search results that are not relevant to a search query in response to a user selecting at least one of the search results that is not relevant to the search query, the one or more search results received in response to performing the search query using one or more search keywords;
      determine one or more exclusion characteristics of the one or more search results that are identified as not being relevant to the search query in response to a user selecting a search result to exclude;
      present a visual indication within the search results of one or more other search results that are not relevant to the search query that have similar exclusion characteristics as the selected search result to exclude, the visual indication presented for each of the one or more other search results that are not relevant to the search query; and
      update the one or more search results based on the one or more exclusion characteristics of the non-relevant search results such that search results that comprise the one or more exclusion characteristics are excluded from the search results.

2. The apparatus of claim 1, wherein updating the one or more search results comprises:
   performing a second search query using the one or more search keywords; and
   presenting search results of the second search query that exclude search results comprising the one or more exclusion characteristics.

3. The apparatus of claim 1, wherein updating the one or more search results comprises removing search results that comprise the one or more exclusion characteristics from the one or more search results.

4. The apparatus of claim 1, wherein the user input indicating one or more search results that are not relevant to the search query comprises a selection of one or more exclusion characteristics of a search result.

5. The apparatus of claim 1, wherein the one or more exclusion characteristics of a search result comprises a date, a topic, a relevance factor, a trending factor, a search term definition, and a popularity.

6. The apparatus of claim 1, wherein the code is further executable by the processor to provide one or more recommendations for excluding search results from the one or more search results.

7. The apparatus of claim 1, wherein the executable code is configured as a plugin to web browser, the plugin executed in response to a search query being performed within a search field of a web page presented within the web browser.

8. The apparatus of claim 1, wherein the executable code is executed on a server performing the search query in response to receiving the one or more keywords and a command to execute the search query.

9. The apparatus of claim 1, wherein the code is further executable by the processor to generate a user profile comprising a user's selections for excluding one or more search results, the user's selections comprising previously selected search results to exclude and previously selected exclusion characteristics of excluded search results.

10. The apparatus of claim 1, wherein the code is further executable by the processor to notify a user of the search results that are excluded from the one or more search results based on the one or more exclusion characteristics.

11. A method comprising:
   identifying, by a processor, one or more search results that are not relevant to a search query in response to a user selecting at least one of the search results that is not relevant to the search query, the one or more search results received in response to performing the search query using one or more search keywords;
   determining one or more exclusion characteristics of the one or more search results that are identified as not being relevant to the search query in response to a user selecting a search result to exclude;

presenting a visual indication within the search results of one or more other search results that are not relevant to the search query that have similar exclusion characteristics as the selected search result to exclude, the visual indication presented for each of the one or more other search results that are not relevant to the search query; and updating the one or more search results based on the one or more exclusion characteristics of the non-relevant search results such that search results that comprise the one or more exclusion characteristics are excluded from the search results.

12. The method of claim 11, wherein updating the one or more search results comprises:

performing a second search query using the one or more search keywords; and presenting search results of the second search query that exclude search results comprising the one or more exclusion characteristics.

13. The method of claim 11, wherein updating the one or more search results comprises removing search results that comprise the one or more exclusion characteristics from the one or more search results.

14. The method of claim 11, wherein the user input indicating one or more search results that are not relevant to the search query comprises a selection of one or more exclusion characteristics of a search result.

15. The method of claim 11, wherein the one or more exclusion characteristics of a search result comprises a date, a topic, a relevance factor, a trending factor, a search term definition, and a popularity.

16. The method of claim 11, further comprising generating a user profile comprising a user's selections for excluding one or more search results, the user's selections comprising previously selected search results to exclude and previously selected exclusion characteristics of excluded search results.

17. The method of claim 11, further comprising notifying a user of the search results that are excluded from the one or more search results based on the one or more exclusion characteristics.

18. A program product comprising a non-transitory computer readable storage medium that stores code executable by a processor, the executable code comprising code to perform:

identifying one or more search results that are not relevant to a search query in response to a user selecting at least one of the search results that is not relevant to the search query, the one or more search results received in response to performing the search query using one or more search keywords;

determining one or more exclusion characteristics of the one or more search results that are identified as not being relevant to the search query in response to a user selecting a search result to exclude;

presenting a visual indication within the search results of one or more other search results that are not relevant to the search query that have similar exclusion characteristics as the selected search result to exclude, the visual indication presented for each of the one or more other search results that are not relevant to the search query; and updating the one or more search results based on the one or more exclusion characteristics of the non-relevant search results such that search results that comprise the one or more exclusion characteristics are excluded from the search results.

19. The apparatus of claim 1, wherein the indication of the one or more other search results that are not relevant to the search query comprises one or more of a highlight of the one or more other search results and a box drawn around the one or more other search results.

20. The method of claim 11, wherein the indication of the one or more other search results that are not relevant to the search query comprises one or more of a highlight of the one or more other search results and a box drawn around the one or more other search results.

* * * * *